(12) United States Patent
Yoo et al.

(10) Patent No.: US 7,678,166 B2
(45) Date of Patent: Mar. 16, 2010

(54) CYCLONE DUST COLLECTING APPARATUS FOR VACUUM CLEANER

(75) Inventors: Dong-hun Yoo, Gwangju (KR); Jang-keun Oh, Gwangju (KR); Jung-gyun Han, Gwangju (KR)

(73) Assignee: Samsung Gwanju Electronics Co., Ltd., Gwangju (KR)

( * ) Notice: Subject to any disclaimer, the term of this patent is extended or adjusted under 35 U.S.C. 154(b) by 769 days.

(21) Appl. No.: 11/494,211

(22) Filed: Jul. 27, 2006

(65) Prior Publication Data

US 2007/0199284 A1    Aug. 30, 2007

Related U.S. Application Data

(60) Provisional application No. 60/776,408, filed on Feb. 24, 2006.

(30) Foreign Application Priority Data

| Mar. 6, 2006 | (KR) | ...................... 10-2006-0020961 |
| Apr. 6, 2006 | (KR) | ...................... 10-2006-0031518 |

(51) Int. Cl.
*B01D 45/12* (2006.01)

(52) U.S. Cl. .............. 55/345; 55/337; 55/346; 55/426; 55/418; 55/459.3; 55/459.4; 55/348; 55/453; 15/353; 15/352; 95/268

(58) Field of Classification Search ............ 55/337, 55/345, 346, 426, 418, 459.3, 459.4, 348, 55/453; 15/353, 352; 95/268
See application file for complete search history.

(56) References Cited

U.S. PATENT DOCUMENTS

| 2,768,707 | A | 10/1956 | Campbell | ............ 55/455 |
| 4,643,748 | A | 2/1987 | Dyson | ............ 55/338 |
| 4,826,515 | A | 5/1989 | Dyson | ............ 55/345 |
| 6,428,589 | B1 | 8/2002 | Blair et al. | ............ 55/318 |
| 6,810,557 | B2 * | 11/2004 | Hansen et al. | ............ 15/353 |
| 6,968,596 | B2 * | 11/2005 | Oh et al. | ............ 15/353 |

(Continued)

FOREIGN PATENT DOCUMENTS

CN    1611177    5/2005

(Continued)

OTHER PUBLICATIONS

British Search on Exam Report dated Nov. 20, 2006 based on Application No. GB0616814.0.

(Continued)

*Primary Examiner*—Jason M Greene
*Assistant Examiner*—Dung Bui
(74) *Attorney, Agent, or Firm*—Ohlandt, Greeley, Ruggiero & Perle, L.L.P.

(57) ABSTRACT

The present disclosure relates to a cyclone dust collecting apparatus for a vacuum cleaner having a high fine dust collecting efficiency. The cyclone dust collecting apparatus includes a first cyclone having an air suction hole through which dust-laden air is drawn-in, the first cyclone forcing the dust-laden air to downwardly whirl in a space under the air suction hole so as to centrifugally separate dust from the dust-laden air; a second cyclone disposed inside the first cyclone, the second cyclone forcing semi-clean air entering from the first cyclone to downwardly whirl so as to centrifugally separate fine dust from the semi-clean air; and an air guiding member forcing the semi-clean air discharged from the first cyclone to directly enter the second cyclone and, the air guiding member having a plurality of guiding blades radially disposed in at least one circular shape based on a vertical axis of the second cyclone.

12 Claims, 14 Drawing Sheets

U.S. PATENT DOCUMENTS

| | | | |
|---|---|---|---|
| 2002/0011052 A1* | 1/2002 | Oh et al. | 55/424 |
| 2002/0020154 A1* | 2/2002 | Yang | 55/337 |
| 2003/0066273 A1* | 4/2003 | Choi et al. | 55/337 |
| 2003/0200622 A1* | 10/2003 | Park et al. | 15/353 |
| 2004/0098827 A1* | 5/2004 | Oh et al. | 15/347 |
| 2004/0107530 A1* | 6/2004 | Lee | 15/353 |
| 2004/0163206 A1* | 8/2004 | Oh | 15/353 |
| 2004/0163207 A1* | 8/2004 | Oh | 15/353 |
| 2004/0211025 A1* | 10/2004 | Jung et al. | 15/353 |
| 2006/0277712 A1* | 12/2006 | Kim et al. | 15/353 |
| 2007/0079579 A1* | 4/2007 | Eddington et al. | 55/337 |

FOREIGN PATENT DOCUMENTS

| | | |
|---|---|---|
| EP | 0923992 | 6/1999 |
| KR | 1020040095374 | 11/2004 |
| WO | WO98/35601 | 8/1998 |
| WO | WO02/069778 | 9/2002 |

OTHER PUBLICATIONS

Office action dated Jan. 16, 2009 corresponding to Chinese patent application No. 200610121810.8.

* cited by examiner

CYCLONE DUST COLLECTING APPARATUS FOR VACUUM CLEANER

CROSS-REFERENCE TO RELATED APPLICATIONS

This application claims the benefit of U.S. provisional application No. 60/776,408 filed Feb. 24, 2006 in the United States Patent & Trademark Office, and claims the benefit of Korean Patent Application Nos. 2006-20961 filed Mar. 6, 2006 and No. 2006-31518 filed Apr. 6, 2006 in the Korean Intellectual Property Office, the disclosures of all of which are incorporated herein by reference in their entirety.

BACKGROUND OF THE INVENTION

1. Field of the Invention

The present disclosure relates to a vacuum cleaner. More particularly, the present disclosure relates to a cyclone dust collecting apparatus separating and collecting dust and dirt using centrifugal force.

2. Description of the Related Art

Generally, the vacuum cleaner generates suction force using a motor so as to draw-in air containing dust, dirt and so on (hereinafter, referred to as dust-laden air) from a surface to be cleaned by the suction force. Dust, dirt and so on contained in the dust-laden air (hereinafter, referred to as dust) is separated from the dust-laden air when the dust-laden air passes through a dust collecting apparatus disposed in a cleaner body of the vacuum cleaner, and cleaned air is discharged outside the cleaner body.

Recently, cyclone dust collecting apparatuses have been widely used as a dust collecting apparatus that separates dust from dust-laden air and collects the separated dust. The cyclone dust collecting apparatuses separate dust from dust-laden air using centrifugal force.

The conventional cyclone dust collecting apparatus includes an air suction pipe drawing-in dust-laden air, a cyclone body forcing the drawn-in dust-laden air to whirl, and an air discharging pipe discharging air having dust separated.

Therefore, the dust-laden air drawn-in through the air suction pipe by suction force forms a whirling air current inside the cyclone body. Then, dust is separated and collected by the centrifugal force caused by the whirling air current, and cleaned air is discharged through the air discharging pipe.

The conventional cyclone dust collecting apparatus can easily separate relatively heavy dust from the drawn-in dust-laden air because there is a great difference between the centrifugal forces operating upon each of the relatively heavy dust and the air. However, the conventional cyclone dust collecting apparatus cannot separate fine dust well from the dust-laden air because there is a little difference between weights of the fine dust and the air.

To increase the fine dust collecting efficiency, U.S. Pat. Nos. 4,643,748, 4,826,515, and 4,853,008 discloses a multi-cyclone dust collecting apparatus that has two cyclones and forces dust-laden air to whirl in two steps.

Because the conventional multi-cyclone dust collecting apparatus forces the dust-laden air to whirl in two steps, it has a higher fine dust collecting efficiency than the cyclone dust collecting apparatus having one cyclone. However, the conventional multi-cyclone dust collecting apparatus has a problem that a great pressure loss occurs when the dust-laden air is drawn-in from an inner cyclone to an outer cyclone.

SUMMARY OF THE INVENTION

The present disclosure has been developed in order to overcome the above drawbacks and other problems associated with the conventional arrangement. An aspect of the present disclosure is to provide a cyclone dust collecting apparatus for a vacuum cleaner having a smaller pressure loss and a higher fine dust collecting efficiency than the conventional cyclone dust collecting apparatus.

The above aspect and/or other feature of the present disclosure can substantially be achieved by providing a cyclone dust collecting apparatus for a vacuum cleaner, which includes a first cyclone having an air suction hole through which dust-laden air is drawn-in, the first cyclone forcing the dust-laden air to downwardly whirl in a space under the air suction hole so as to centrifugally separate dust from the dust-laden air; a second cyclone disposed inside the first cyclone, the second cyclone forcing semi-clean air entering from the first cyclone to downwardly whirl so as to centrifugally separate fine dust from the semi-clean air; and an air guiding member forcing the semi-clean air discharged from the first cyclone to directly enter the second cyclone and, the air guiding member having a plurality of guiding blades radially disposed in at least one circular shape based on a vertical axis of the second cyclone. The plurality of guiding blades forms a plurality of slots to simultaneously function as an air discharging opening of the first cyclone and an air entering opening of the second cyclone.

The cyclone dust collecting apparatus further comprises an air suction pipe disposed to be downwardly inclined at an upper side of the first cyclone in a substantially tangential direction to the first cyclone body.

The plurality of guiding blades comprises four guiding blades disposed by regular angular intervals based on the vertical axis.

The plurality of guiding blades is inclined in a direction identical with or in a direction opposite to the direction in which the dust-laden air whirls.

The cyclone dust collecting apparatus further comprises an air discharging pipe disposed at a center of a top end of the second cyclone, the air-discharging pipe extending to the same level as a bottom end of the air guiding member, or to a lower level than the bottom end of the air guiding member; wherein the air discharging pipe discharges cleaned air from the second cyclone in a direction opposite to the gravity direction.

The cyclone dust collecting apparatus further comprises a dust collecting receptacle detachably disposed under the first and second cyclones so as to collect dust discharged from the first and second cyclones.

The dust collecting receptacle comprises: a first dust collecting chamber collecting dust separated from the first cyclone; and a second dust collecting chamber collecting fine dust separated from the second cyclone.

The cyclone dust collecting apparatus further comprises a sealing member disposed at a bottom end of the second cyclone, the sealing member sealing the second dust collecting chamber not to be in fluid communication with the first dust collecting chamber, when the dust collecting receptacle is mounted at the first cyclone.

The sealing member is rolled up by the dust collecting receptacle so as to seal the second dust collecting chamber.

The cyclone dust collecting apparatus further comprises a backflow preventing member disposed at the second cyclone, the backflow preventing member preventing dust collected in the first dust collecting chamber from flowing back; wherein the backflow preventing member is made of an elastic material.

The cyclone dust collecting apparatus further comprises a dust cap disposed at a bottom end of the second cyclone, the dust cap preventing fine dust collected in the second dust collecting chamber from flowing back.

According to another aspect of the present disclosure, a cyclone dust collecting apparatus for a vacuum cleaner comprises: a first cyclone having an air suction hole through which dust-laden air is drawn-in, the first cyclone forcing the dust-laden air to downwardly whirl in a space under the air suction hole so as to centrifugally separate dust from the dust-laden air; a second cyclone disposed inside the first cyclone, the second cyclone forcing semi-clean air entering from the first cyclone to downwardly whirl so as to centrifugally separate fine dust from the semi-clean air; and an air guiding member having a plurality of slots to form an air discharging opening of the first cyclone and an air entering opening of the second cyclone, the air guiding member forcing the semi-clean air entering from the first cyclone to downwardly whirl. The plurality of slots is formed by a plurality of first guiding blades and a plurality of second guiding blades disposed in two concentric circles based on a vertical axis of the second cyclone.

The number of the first guiding blades is less than the number of the second guiding blades.

The length of the first guiding blades is longer than the length of the second guiding blades.

The air guiding member further comprises an inclined surface downwardly inclined inside the plurality of first guiding blades.

The plurality of first and second guiding blades is inclined in the same direction as the direction in which the dust-laden air whirls.

The plurality of first guiding blades is inclined in the same direction as the direction in which the dust-laden air whirls, and the plurality of second guiding blades is inclined in the direction opposite to the direction in which the dust-laden air whirls.

The plurality of first guiding blades is inclined in the direction opposite to the direction in which the dust-laden air whirls, and the plurality of second guiding blades is inclined in the same direction as the direction in which the dust-laden air whirls.

The plurality of first and second guiding blades is inclined in the direction opposite to the direction in which the dust-laden air whirls.

The cyclone dust collecting apparatus further comprises a filtering member disposed at an upper side of the air guiding member, the filtering member filtering cleaned air discharged from the second cyclone.

The filtering member detachably disposed at the first cyclone, and the air guiding member is detachably disposed at an under side of the filtering member.

Other objects, advantages and salient features of the disclosure will become apparent from the following detailed description, which, taken in conjunction with the annexed drawings, discloses preferred embodiments of the disclosure.

BRIEF DESCRIPTION OF THE DRAWINGS

These and/or other aspects and advantages of the disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE
EXEMPLARY EMBODIMENTS

Hereinafter, certain exemplary embodiments of the present disclosure will be described in detail with reference to the accompanying drawings.

The matters defined in the description, such as a detailed construction and elements thereof are provided to assist in a comprehensive understanding of the disclosure. Thus, it is apparent that the present disclosure may be carried out without those defined matters. Also, well-known functions or constructions are omitted to provide a clear and concise description of exemplary embodiments of the present disclosure.

Figure 1:
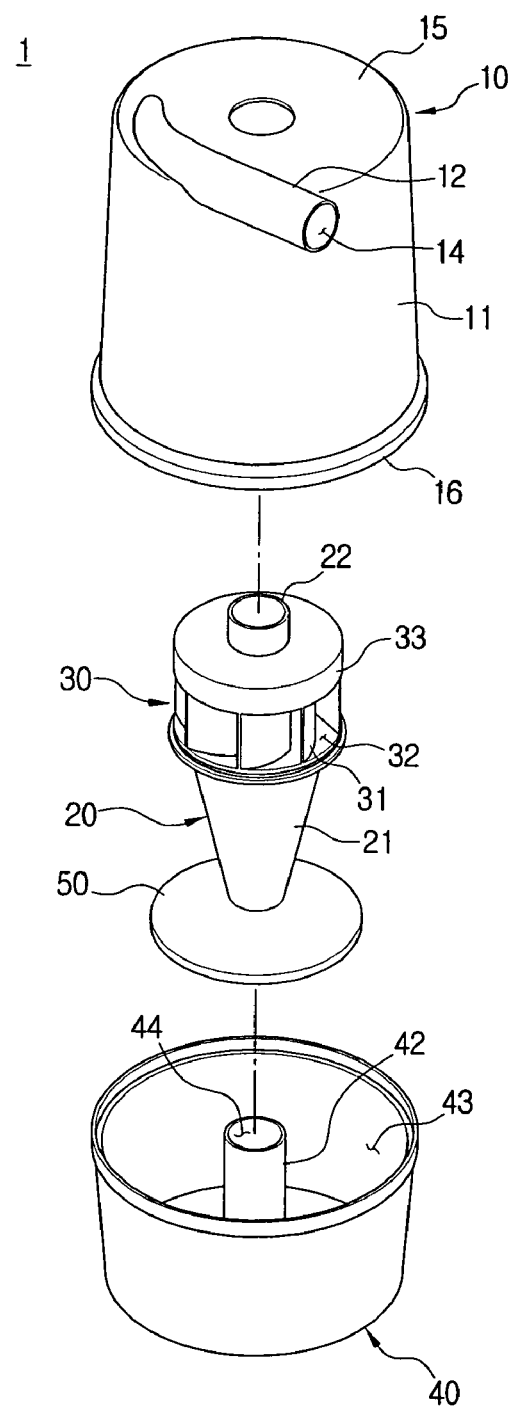
FIG. 1 is an exploded perspective view illustrating a cyclone dust collecting apparatus for a vacuum cleaner according to the first embodiment of the present disclosure.
Figure 2:
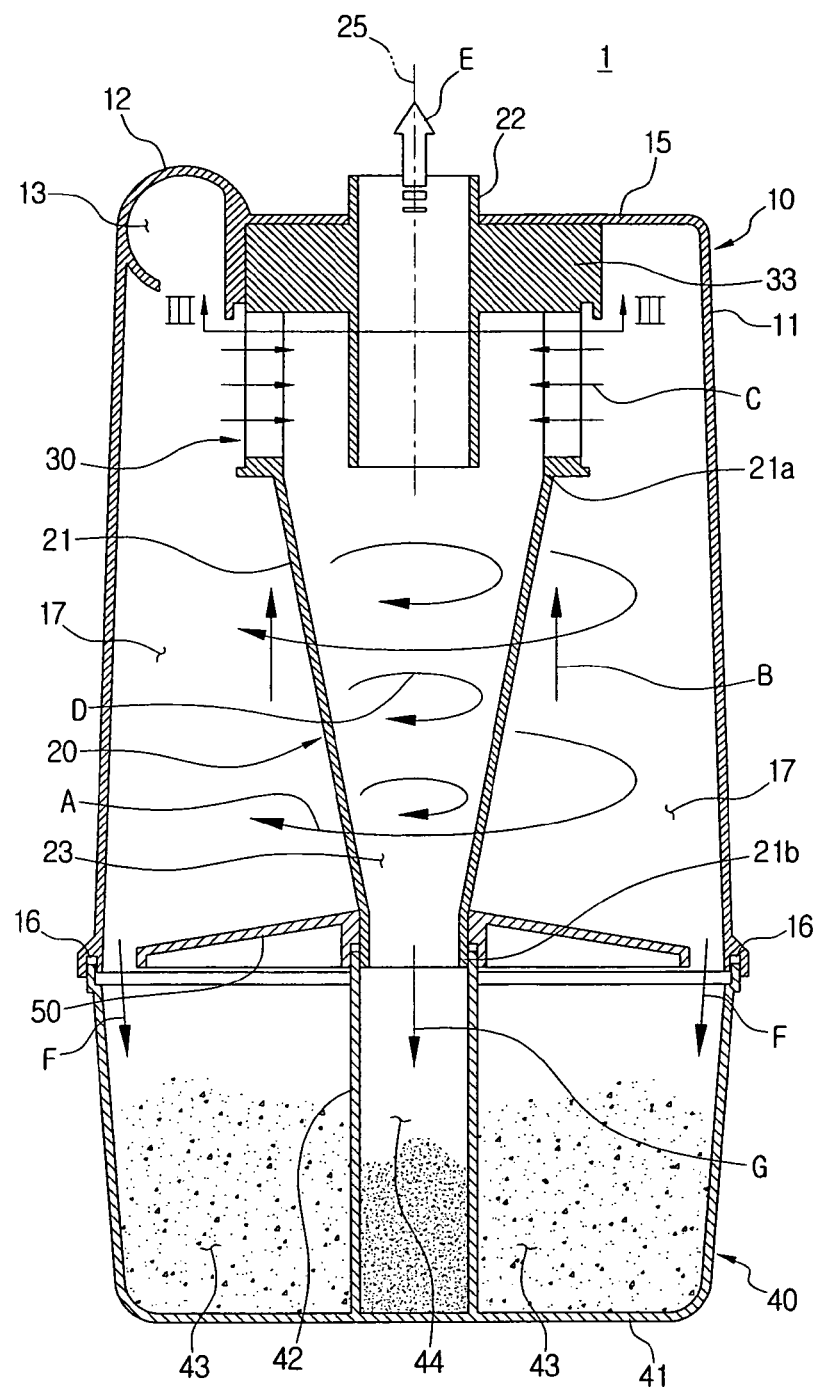
FIG. 2 is a sectional view illustrating the cyclone dust collecting apparatus of FIG. 1.

Referring to FIGS. 1 and 2, a cyclone dust collecting apparatus 1 for a vacuum cleaner according to the first embodiment of the present disclosure includes a first cyclone 10, a second cyclone 20, and a dust collecting receptacle 40.

The first cyclone 10 draws-in outside air containing dust, dirt, and so on (hereinafter, referred to as dust-laden air), and forces the dust-laden air to downwardly whirl inside the first cyclone 10 so that dust, dirt and so on (hereinafter, referred to as dust) is separated from the dust-laden air by centrifugal force. Then, the first cyclone 10 discharges air having dust partially removed (hereinafter, referred to as semi-clean air) to the second cyclone 20.

The first cyclone 10 has a first cyclone body 11 and an air suction pipe 12. The first cyclone body 11 is formed in a substantially hollow cylindrical shape with a top end closed by a top wall 15 and an opened bottom end. At an upper side of the first cyclone body 11 is formed an air suction hole 13 through which the dust-laden air is drawn-in. Preferably, the air suction hole 13 is disposed at a higher level than an air guiding member 30 described below. The bottom end of the first cyclone body 11 is in fluid communication with the dust collecting receptacle 40. The first cyclone body 11 has a length that is long enough to form a whirling space 17 in which the drawn-in dust-laden air can whirl downwardly. In other words, the first cyclone body 11 has the whirling space 17 of the dust-laden air between the air guiding member 30 and a backflow preventing member 50 described below.

The air suction pipe 12 is disposed at the upper side of the first cyclone 10, namely, at a place corresponding to the air suction hole 13 of the first cyclone body 11, and is disposed in a substantially tangential direction to the first cyclone body 11. Also, the air suction pipe 12 is downwardly inclined with respect to the first cyclone body 11 so as to force the dust-laden air drawing-in inside the first cyclone body 11 to form a first downwardly whirling air current that the dust-laden air whirls downwardly. In other words, the air suction pipe 12 is disposed at the upper side of the first cyclone body 11 such that an entrance 14 of the air suction pipe 12 is higher than an exit thereof. The exit of the air suction pipe 12 corresponds to the air suction hole 13 of the first cyclone body 11.

The second cyclone 20 is disposed inside the first cyclone 10, draws-in the semi-clean air discharged from the first cyclone 10, and forces the semi-clean air to form a second whirling air current. Then, fine dust remaining in the semi-clean air discharged from the first cyclone 10 is separated by the centrifugal force caused by the second whirling air current. At this time, the size of the second cyclone 20 is smaller than the size of the first cyclone 10 so that the second cyclone 20 can remove fine dust that has not been separated in the first cyclone 10.

The second cyclone 20 has a second cyclone body 21, an air guiding member 30, and an air-discharging pipe 22. The second cyclone body 21 is formed in a substantially hollow cylindrical shape with opened opposite ends 21a and 21b. An opened top end 21a and opened bottom end 21b are in fluid communication with the air guiding member 30 and the dust collecting receptacle 40, respectively. The semi-clean air entering through the air guiding member 30 forms the second downwardly whirling air current in a space 23 inside the second cyclone body 21. Referring to FIG. 2, the second cyclone body 21 has a substantially conical shape such that a diameter of the second cyclone body 21 decreases from the top end 21a thereof to the bottom end 21b thereof. In other words, a diameter of the top end 21a of the second cyclone body 21 is larger than a diameter of the bottom end 21b thereof. Alternatively, although not shown, the second cyclone body 21 can be formed in a substantially hollow cylindrical shape.

The air guiding member 30 is disposed on a bottom surface of the top wall 15 of the first cyclone body 11. The second cyclone body 21 is connected to a bottom end of the air guiding member 30. The air guiding member 30 simultaneously functions as an air discharging opening of the first cyclone 10 and an air entering opening of the second cyclone 20. In other words, the semi-clean air discharged from the first cyclone 10 directly enters inside the second cyclone 20 via the air guiding member 30.

Figure 3:
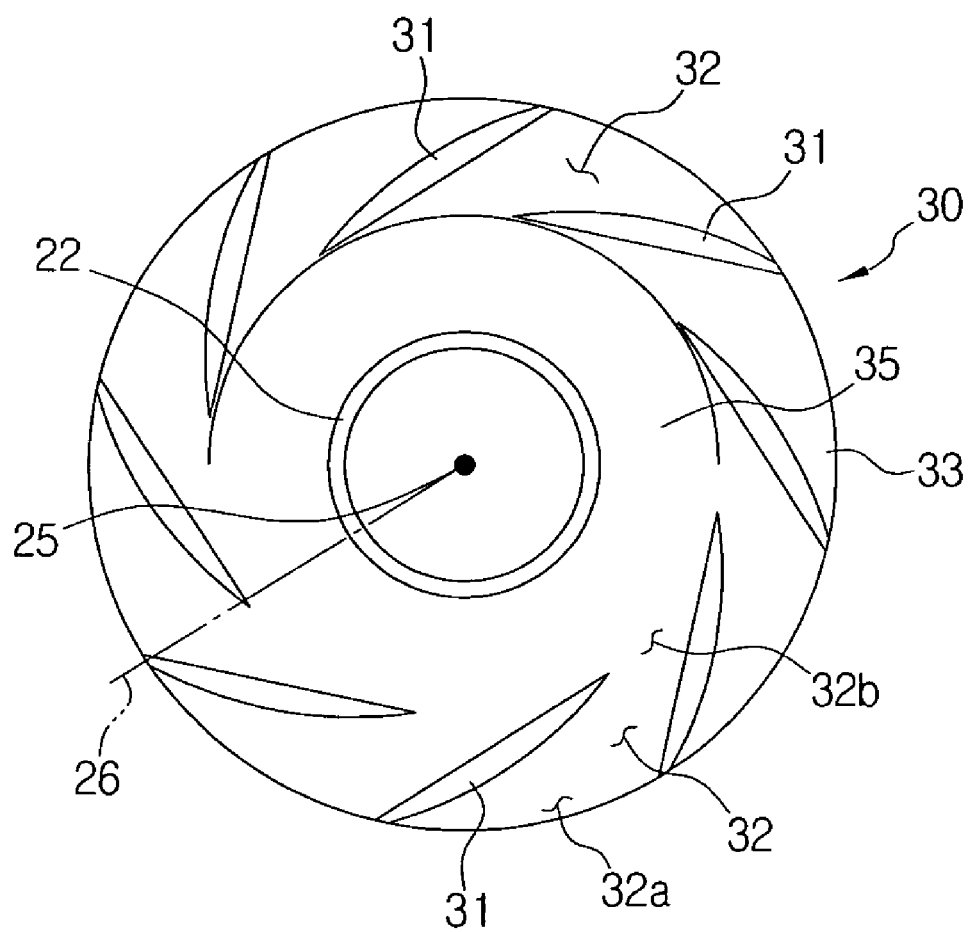
FIG. 3 is a sectional view illustrating the cyclone dust collecting apparatus of FIG. 2, taken along a line III-III in FIG. 2.

The air guiding member 30 has a base 33 and a plurality of guiding blades 31. Referring FIG. 3, the plurality of guiding blades 31 radially arranged in a circular shape based on a vertical axis 25 of the second cyclone 20. Spaces defined between the pluralities of guiding blades 31 form a plurality of slots 32 for the semi-clean air to be drawn-in. An entrance 32a of each of the plurality of slots 32 is equivalent to the air discharging opening of the first cyclone 10, and an exit 32b of each of the plurality of slots 32 is equivalent to the air entering opening of the second cyclone 20. Therefore, the air discharging opening, through which the semi-clean air is discharged from the first cyclone 10, and the air entering opening, through which the semi-clean air enters the second cyclone 20, comprise a plurality of air discharging openings and air entering openings, respectively. The air discharging opening is disposed at the same level as the air entering opening. Also, each of the plurality of guiding blades 31 is disposed to be inclined with respect to a straight line 26 joining a center of the air guiding member 30, namely, the vertical axis 25 of the second cyclone 20 as shown in FIG. 3. A section of the guiding blade 31 is formed in a substantially streamline shape. In other words, the air guiding member 30 has a substantially similar structure and shape to those of general impellers. As a result, the semi-clean air entering inside the second cyclone 20 through the plurality of guiding blades 31 forms the second whirling air current.

Figure 4A:
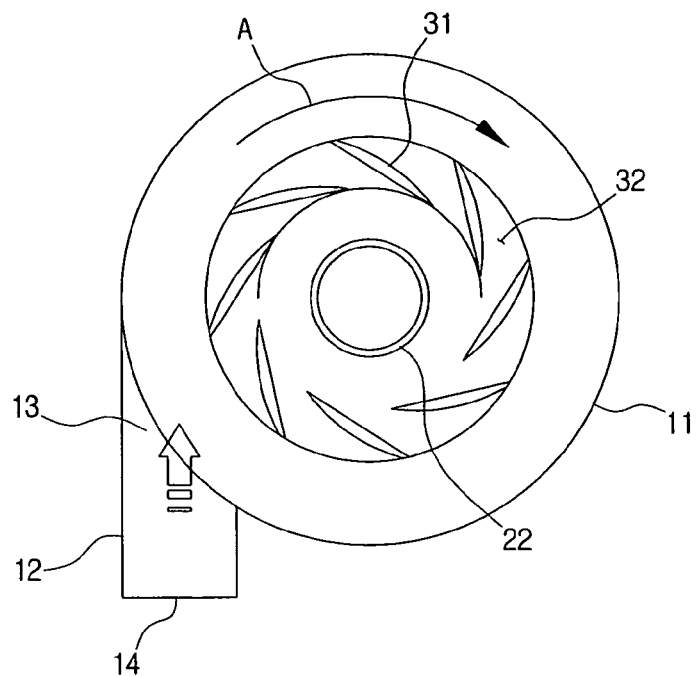
FIGS. 4A and 4B are concept views illustrating an arrangement of a plurality of guiding blades according to a direction in which the dust-laden air whirls in the cyclone dust collecting apparatus of FIG. 1 according to the first embodiment of the present disclosure.
Figure 4B:
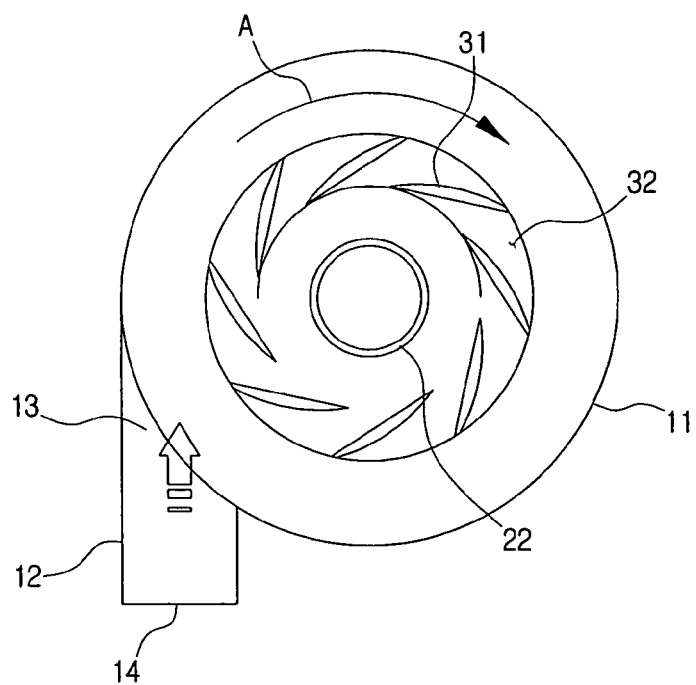

The number of the plurality of guiding blades 31 can be variously determined, but the air guiding member 30 preferably has four or more guiding blades 31. Furthermore, the plurality of guiding blades 31 are variously arranged, but, preferably, the plurality of guiding blades 31 are radially arranged by regular angular intervals based on the vertical axis 25 of the second cyclone 20. In this embodiment, eight guiding blades 31 are radially arranged by regular angular intervals. Also, each of the plurality of guiding blades 31 may be disposed to be inclined in a direction identical with or in a direction opposite to the direction in which the dust-laden air entering the first cyclone 10 whirls inside the first cyclone 10 as shown in FIGS. 4A and 4B. FIG. 4A shows the plurality of guiding blades 31 inclined in the same direction to the whirling direction A of the dust-laden air. FIG. 4B shows the plurality of guiding blades 31 inclined in the opposite direction to the whirling direction A of the dust-laden air. In the cyclone dust collecting apparatus 1 according to the first embodiment of the present disclosure, the dust collecting efficiency and the pressure loss varies according to the number, shapes, and arranging directions of the plurality of guiding blades 31. Preferably, the number, shapes, and arranging directions of the plurality of guiding blades 31 are determined according to the use and/or purpose of the cyclone dust collecting apparatus 1.

The plurality of guiding blades 31 is fixed on the base 33. An inclined surface 35 is formed at an inner area of the base 33 surrounded by the plurality of guiding blades 31. The inclined surface 35 is downwardly inclined so that the semi-clean air entering through the plurality of slots 32 between the pluralities of guiding blades 31 forms the second downwardly whirling air current.

The air discharging pipe 22 is disposed at a center of the base 33 of the air guiding member 30, and is formed in a substantially hollow cylindrical shape with opened opposite ends. The opened top end is in fluid communication with a vacuum generator (not shown), and the opened bottom end is in fluid communication with the inner space 23 of the second cyclone body 21, namely, the space 23 where the second downwardly whirling air current is formed. Therefore, the air discharging pipe 22 discharges cleaned air having fine dust removed in the second cyclone 20 in a direction opposite to the gravity direction. Preferably, the bottom end of the air-discharging pipe 22 extends to the same level as the bottom end of the air guiding member 30, or to a lower level than the bottom end of the air guiding member 30.

On the other hand, the second cyclone body 21, the air guiding member 30, and air-discharging pipe 22 composing the second cyclone 20 is preferably molded as a single piece. As a result, the number of parts and the manufacturing cost of the cyclone dust collecting apparatus 1 are decreased. Furthermore, preferably, the second cyclone 20 is detachably disposed at the first cyclone 10.

The dust collecting receptacle 40 is disposed below the first cyclone body 11, and collects dust discharged from the first cyclone 10 and the second cyclone 20. The dust collecting receptacle 40 is formed in a substantially hollow cylindrical shape with an opened top end and a bottom end closed by a bottom wall 41. A partition wall 42 is formed at a center of the bottom wall 41 of the dust collecting receptacle 40. The partition wall 42 has a substantially hollow cylindrical shape with a diameter corresponding to the bottom end 21b of the second cyclone body 21. Accordingly, the dust collecting receptacle 40 is partitioned into two spaces 43 and 44 by the partition wall 42. An outer space 43 of the partition wall 42 forms a first dust collecting chamber, and an inner space 44 of the partition wall 42 forms a second dust collecting chamber. The first dust collecting chamber 43 collects dust discharged from the first cyclone 10, and the second dust collecting chamber 44 collects fine dust discharged from the second cyclone 20. A first connecting part 16 with a groove shape is formed at the bottom end of the first cyclone body 11 so that the top end of the dust collecting receptacle 40 is inserted into the first connecting part 16. A sealing member (not shown) may be disposed inside the first connecting part 16 so that the first dust collecting chamber 43 is hermetically sealed to the outside. The sealing member may be made of a rubber material with a ring shape. The bottom end 21b of the second cyclone body 21 is formed such that a top end of the partition wall 42 can be inserted into the bottom end 21b of the second cyclone body 21. As a result, when the top end of the dust collecting receptacle 40 is inserted into the first connecting part 16, the bottom end 21b of the second cyclone body 21 is inserted into the top end of the partition wall 42. When the dust collecting receptacle 40 is inserted into the first connecting part 16 and the bottom end 21b of the second cyclone body 21 is inserted into the top end of the partition wall 42, the first dust collecting chamber 43 is not in fluid communication with the outside and the second dust collecting chamber 44 is not in fluid communication with the first dust collecting chamber 41.

Furthermore, a backflow preventing member 50 is preferably disposed between the first cyclone body 11 and the dust collecting receptacle 40 so as to prevent dust collected in the first dust collecting chamber 43 from re-scattering and flowing back to the first cyclone body 11. The backflow preventing member 50 is disposed at the second cyclone 20. The height at which the backflow preventing member 50 is disposed determines the size of the whirling space 17 in which the dust laden air whirls, and the volume of the dust collecting receptacle 40. In this embodiment, the backflow preventing member 50 is disposed at a lower portion of the second cyclone body 21 as shown in FIG. 2. Also, the backflow preventing member 50 is formed in a substantially conical shape, and has a smaller diameter than an inner diameter of the bottom end of the first cyclone body 11 so that dust separated at the first cyclone 10 can fall into the dust collecting receptacle 40. At this time, the backflow preventing member 50 is preferably made of an elastic material such as a rubber. As a result, relatively large and heavy dust such as cigarette butts, bottle caps, and so on can fall into the dust collecting receptacle 40 through a gap between the backflow preventing member 50 and the inner surface of the first cyclone body 11, and the backflow preventing member 50 can prevent the dust collected in the dust collecting receptacle 40 from re-scattering.

Hereinafter, operation and function of the cyclone dust collecting apparatus 1 for a vacuum cleaner according to the first embodiment of the present disclosure with the above-described structure is explained with reference to FIGS. 1 to 4B.

Upon turning on the vacuum cleaner, a vacuum generator (not shown) is operated to generate suction force. Dust-laden air is drawn-in into the air suction pipe 12 of the first cyclone 10 by the suction force. The air suction pipe 12 is downwardly inclined in a tangential direction to the upper side of the first cyclone body 11 so that the dust-laden air passes through the air suction pipe 12 and forms the first downwardly whirling air current A in the space 17 inside the first cyclone body 11. Then, dust is separated from the dust-laden air by centrifugal force caused by the first downwardly whirling air current A. The separated dust F falls along the inner surface of the first cyclone body 11, and then, is collected in the first dust collecting chamber 43 of the dust collecting receptacle 40 through the gap between the backflow preventing member 50 and the inner surface of the first cyclone body 11. Because the backflow preventing member 50 is made of elastic material, heavy dust with a larger size than the size of the gap between the backflow preventing member 50 and the first cyclone body 11 such as bottle caps, cigarette butts, and so on can pass through the backflow preventing member 50 so as to be collected in the dust collecting receptacle 40.

The semi-clean air B having dust separated rises to enter the plurality of slots 32 of the air guiding member 30. The semi-clean air C passed through the plurality of slots 32 enters the second cyclone 20. At this time, the plurality of slots 32 are formed by the plurality of inclined guiding blades 31, and the air guiding member 30 has the inclined surface 35 on the base 33 thereof so that the semi-clean C air passed through the plurality of slots 32 forms the second downwardly whirling air current D in the space 23 inside the second cyclone body 21. Then, fine dust remaining in the semi-clean air is separated by centrifugal force caused by the second downwardly whirling air current D. The separated fine dust G falls and is collected in the second dust collecting chamber 44. Cleaned air E having fine dust removed re-rises to enter the air discharging pipe 22 disposed at a center of the air guiding member 30. The cleaned air E entering the air discharging pipe 22 passes through the vacuum generator (not shown), and then, is discharged outside the cleaner body (not shown).

Hereinafter, a cyclone dust collecting apparatus 2 for a vacuum cleaner according to the second embodiment of the present disclosure is explained with reference to FIGS. 5 to 8D.

Figure 5:
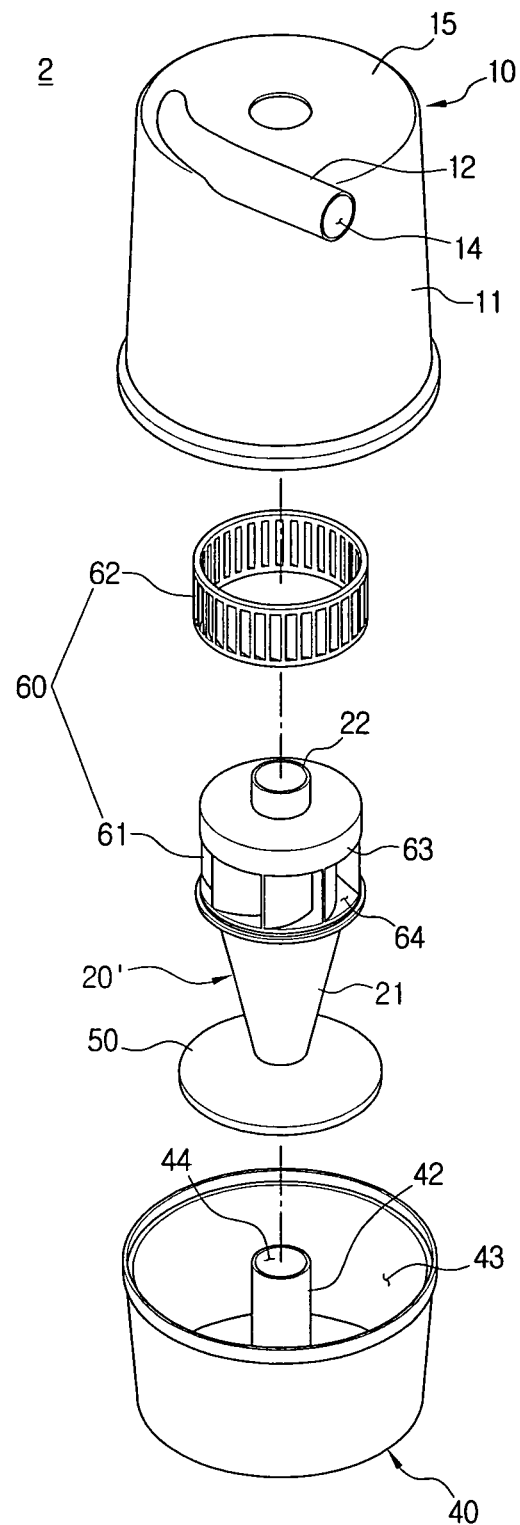
FIG. 5 is an exploded perspective view illustrating a cyclone dust collecting apparatus for a vacuum cleaner according to the second embodiment of the present disclosure.
Figure 6:
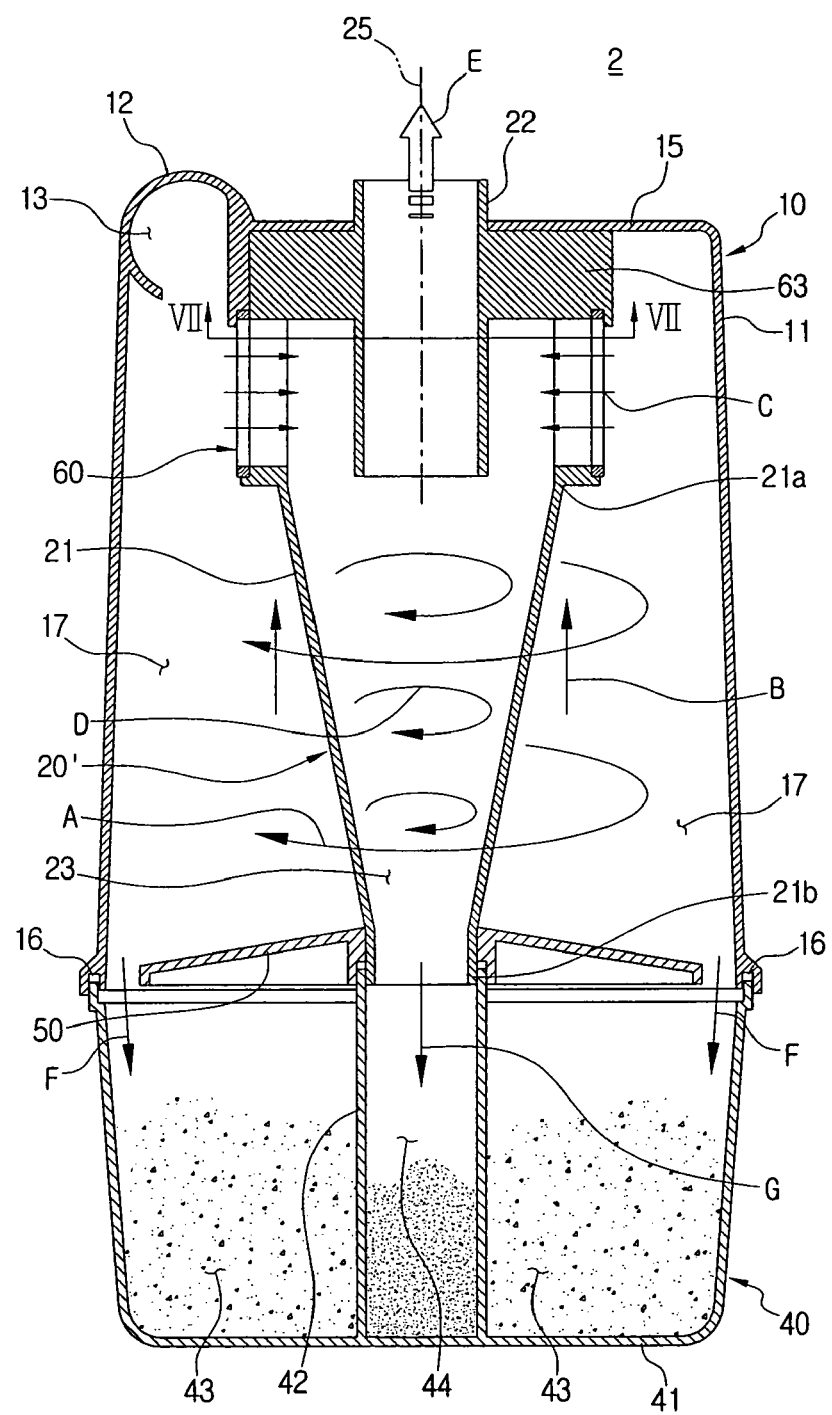
FIG. 6 is a sectional view illustrating the cyclone dust collecting apparatus of FIG. 5.

Referring to FIGS. 5 and 6, a cyclone dust collecting apparatus 2 for a vacuum cleaner according to the second embodiment of the present disclosure includes a first cyclone 10, a second cyclone 20', and a dust collecting receptacle 40.

The cyclone dust collecting apparatus 2 according to the second embodiment has the same first cyclone 10 and dust collecting receptacle 40 as those of the cyclone dust collecting apparatus 1 according to the first embodiment as described above except the second cyclone 20'. Therefore, the second cyclone 20' is only described hereinafter.

The second cyclone 20' is disposed inside the first cyclone 10, takes the semi-clean air C discharged from the first cyclone 10, and forces the semi-clean air C to form the second downwardly whirling air current D. Then, fine dust is separated from the semi-clean air C discharged from the first cyclone 10 by centrifugal force caused by the second downwardly whirling air current D.

The second cyclone 20' includes a second cyclone body 21, an air guiding member 60, and an air discharging pipe 22. The air guiding member 60 is disposed on a bottom surface of the top wall 15 of the first cyclone body 11. A bottom end of the air guiding member 60 is connected to the second cyclone body 21. The air guiding member 60 simultaneously functions as an air discharging opening of the first cyclone 10 and an air entering opening of the second cyclone 20'. In other words, the semi-clean air discharged from the first cyclone 10 directly enters inside the second cyclone 20' via the air guiding member 60. The air guiding member 60 has a base 63 and a plurality of guiding blades 61 and 62.

Figure 7:
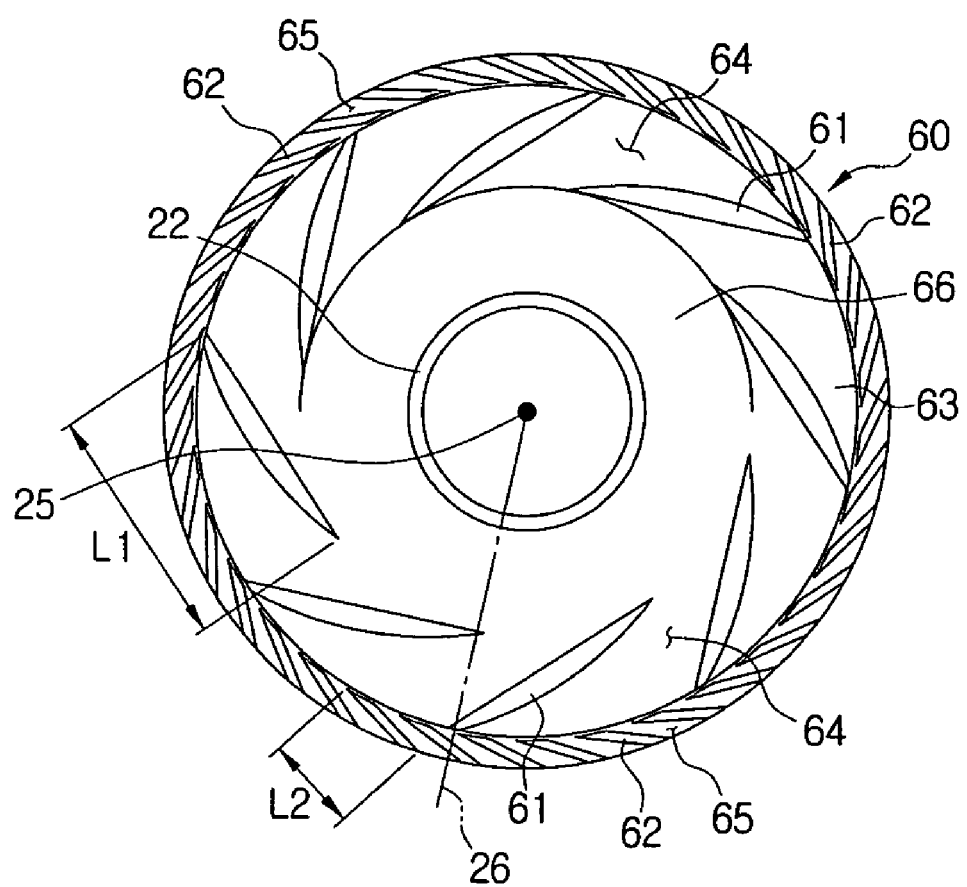
FIG. 7 is a sectional view illustrating the cyclone dust collecting apparatus of FIG. 6, taken along a line VII-VII in FIG. 6.

The plurality of guiding blades 61 and 62 is radially arranged in a circular shape based on a vertical axis 25 of the second cyclone 20'. In present embodiment, the plurality of guiding blades 61 and 62 is arranged in two concentric circles based on the vertical axis 25 of the second cyclone 20' as shown in FIG. 7. Although the plurality of guiding blades 61 and 62 according to this embodiment is arranged in two concentric circles, this is for illustrative purposes only. Alternatively, the plurality of guiding blades 61 and 62 may be arranged in three or more concentric circles. In this embodiment, the plurality of guiding blades 61 forming an inner circle is referred to as first guiding blades, and the plurality of guiding blades 62 forming an outer circle is referred to as second guiding blades. The first and second guiding blades 61 and 62 of the air guiding member 60 is integrally molded with the second cyclone body 21 and the air discharging pipe 22. Alternatively, as shown in FIG. 6, the plurality of second guiding blades 62 is molded as a separate part with a ring shape, and the plurality of first guiding blades 61 is integrally molded with the second cyclone body 21 and the air discharging pipe 22. Then, the plurality of second guiding blades 62 is mounted at the outside of the first guiding blades 61, thereby forming the air guiding member 60.

Referring to FIG. 7, spaces defined between the pluralities of first and second guiding blades 61 and 62 form a plurality of first and second slots 64 and 65 for semi-clean air to pass through. An entrance of each of the plurality of first slots 64 is equivalent to the air discharging opening of the first cyclone 10, and an exit of each of the plurality of second slots 65 is equivalent to the air entering opening of the second cyclone 20'. Therefore, the semi-clean air is discharged through the plurality of air discharging openings from the first cyclone 10, and enters the second cyclone 20' through the plurality of air entering openings. The plurality of air discharging openings is disposed at the same level as the plurality of air entering openings. Also, each of the plurality of first and second guiding blades 61 and 62 is disposed to be inclined with respect to a straight line 26 joining a center of the air guiding member 60, namely, the vertical axis 25 of the second cyclone 20' as shown in FIG. 7. Preferably, the number of the second guiding blades 62 is larger than the number of the first guiding blades 61. For examples, when the number of the first guiding blades 61 is four, six, eight, and ten, the number of the second guiding blades 62 corresponding to the first guiding blades 61 is 38, 40, 42, and 44, respectively. Furthermore, the length L2 of each of the second guiding blades 62 is preferably shorter than the length L1 of each of the first guiding blades 61. As a result, the second guiding blades 62 filter dust entering the air guiding member 60 with the semi-clean air discharged from the first cyclone 10. In other words, the second guiding blades 62 serve as a filter filtering semi-clean air discharged from the first-cyclone 10 to the second cyclone 20'. The first guiding blades 61 force the semi-clean air passing through them to form a whirling air current. Accordingly, the semi-clean air passing through the air guiding member 60 forms the second downwardly whirling air current inside the second cyclone 20'.

Figure 8A:
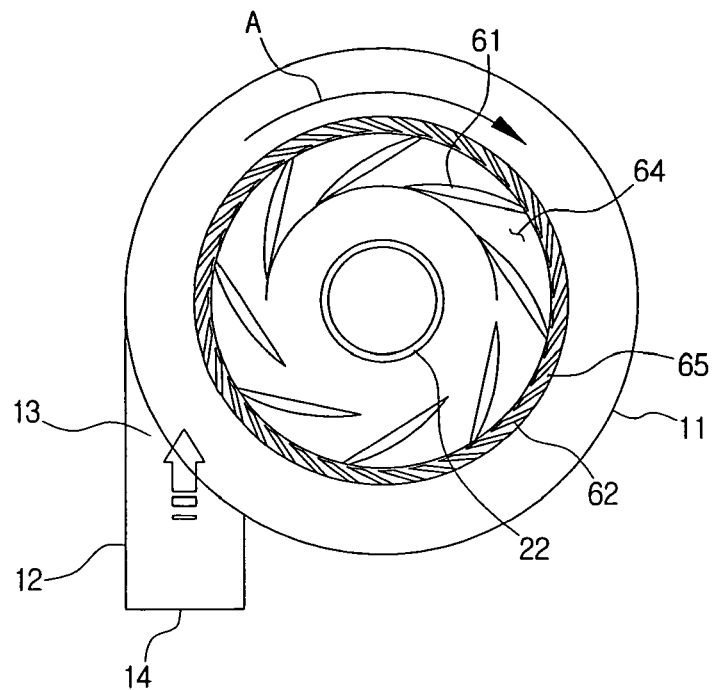
FIGS. 8A to 8D are concept views illustrating an arrangement of a plurality of first and second guiding blades according to a direction in which the dust-laden air whirls in the cyclone dust collecting apparatus of FIG. 5 according to the second embodiment of the present disclosure.
Figure 8B:
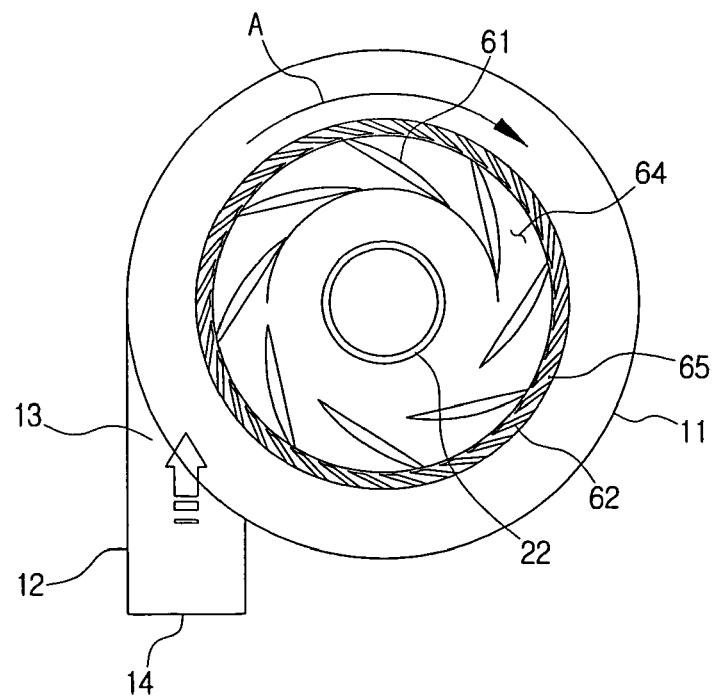
Figure 8C:
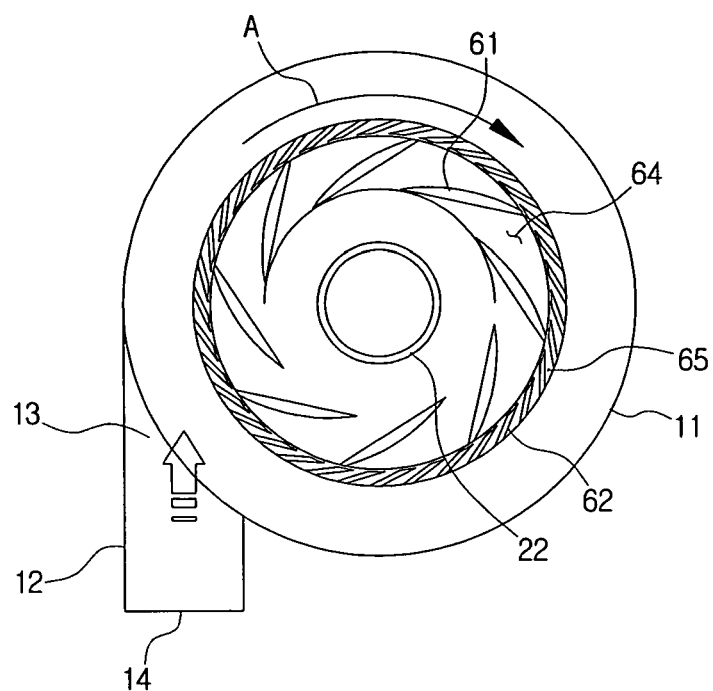
Figure 8D:
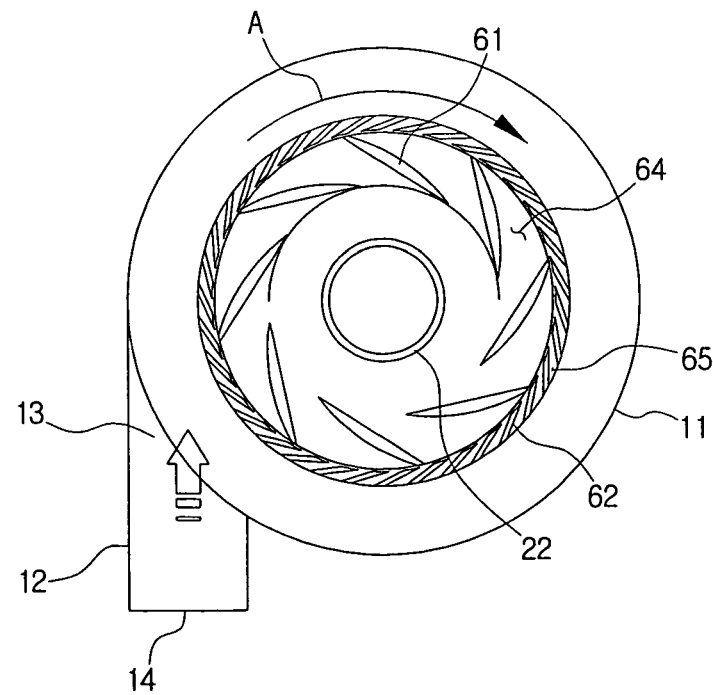

The plurality of first and second guiding blades 61 and 62 can be arranged in various methods. However, preferably, the first and second guiding blades 61 and 62 are radially arranged by regular angular intervals with respect to the vertical axis 25 of the second cyclone 20'. In this embodiment, eight (8) first guiding blades 61 are radially disposed by regular angular intervals, and forty (40) second guiding blades 62 are radially disposed by regular angular intervals outside the first guiding blades 61. Also, each of the plurality of first and second guiding blades 61 and 62 is inclined in a direction identical with or in a direction opposite to the direction A in which the dust-laden air entering the first cyclone 10 whirls in the first cyclone 10. FIGS. 8A to 8D show examples of the air guiding member 60 according to the inclined direction of the first and second guiding blades 61 and 62. FIG. 8A shows an air guiding member 60 having the plurality of outside second guiding blades 62 inclined in the same direction to the whirling direction A of the dust-laden air, and the plurality of inside first guiding blades 61 inclined in the opposite direction to the whirling direction A of the dust-laden air. FIG. 8B shows an air guiding member 60 having the plurality of first and second guiding blades 61 and 62 inclined in the same direction to the whirling direction A of the dust-laden air. FIG. 8C shows an air guiding member 60 having the plurality of first and second guiding blades 61 and 62 disposed in the opposite direction to the whirling direction A of the dust-laden air. FIG. 8D shows an air guiding member 60 having the plurality of second guiding blades 62 inclined in the opposite direction to the whirling direction A of the dust-laden air, and the plurality of first guiding blades 61 inclined in the same direction to the whirling direction A of the dust-laden air. Table 1 shows the dust collecting efficiency and pressure loss of the cyclone dust collecting apparatus 2 for a vacuum cleaner having each of the above-described air guiding members 60.

TABLE 1

| Arrangement of the guiding blades | Dust collecting efficiency (%) | Pressure loss (mmH$_2$O) |
|---|---|---|
| FIG. 8B | 94.85 | 115 |
| FIG. 8C | 95.8 | 116 |
| FIG. 8D | 96.0 | 175 |

Referring to Table 1, the dust collecting efficiency and the pressure loss of the cyclone dust collecting apparatus 2 according to the second embodiment of the present disclosure vary according to the arrangement of the first and second guiding blades 61 and 62. Furthermore, the dust collecting efficiency of the dust collecting apparatus 2 varies according to the number and shapes of the first and second guiding blades 61 and 62. Therefore, the number, shapes, and arranging directions of the plurality of first and second guiding blades 61 and 62 are preferably determined according to the use and/or purpose of the cyclone dust collecting apparatus 2.

The plurality of first guiding blades 61 is fixed on the base 63. An inclined surface 66 is formed on an inner area of the base 63 surrounded by the plurality of first guiding blades 61. The inclined surface 63 is downwardly inclined so that the semi-clean air entering through the plurality of first slots 64 between the pluralities of first guiding blades 61 forms a second downwardly whirling air current. The plurality of second guiding blades 62 is integrally formed with the base 63. Alternatively, the second guiding blades 62 are formed in a separate part so as to be mounted outside the first guiding blades 61. The base 63 forms a top surface of the second cyclone 20'.

The second cyclone body 21 and air-discharging pipe 22 according to this embodiment is the same as those of the cyclone dust collecting apparatus 1 according to the first embodiment of the present disclosure, and therefore, detailed descriptions thereof are omitted.

Furthermore, operation and function of the cyclone dust collecting apparatus 2 according to this embodiment are substantially the same as those of the cyclone dust collecting apparatus 1 according to the first embodiment, and therefore, detailed descriptions thereof are omitted. However, there is one exception that the plurality of second guiding blades 62 filters dust moving with the semi-clean air, which is discharged from the first cyclone body 11 to the air guiding member 60, and the plurality of first guiding blades 61 forces the semi-clean air passed the air guiding member 60 to form the whirling air current.

Hereinafter, a cyclone dust collecting apparatus 3 for a vacuum cleaner according to the third embodiment of the present disclosure is described with reference to FIGS. 9 and 10.

Figure 9:
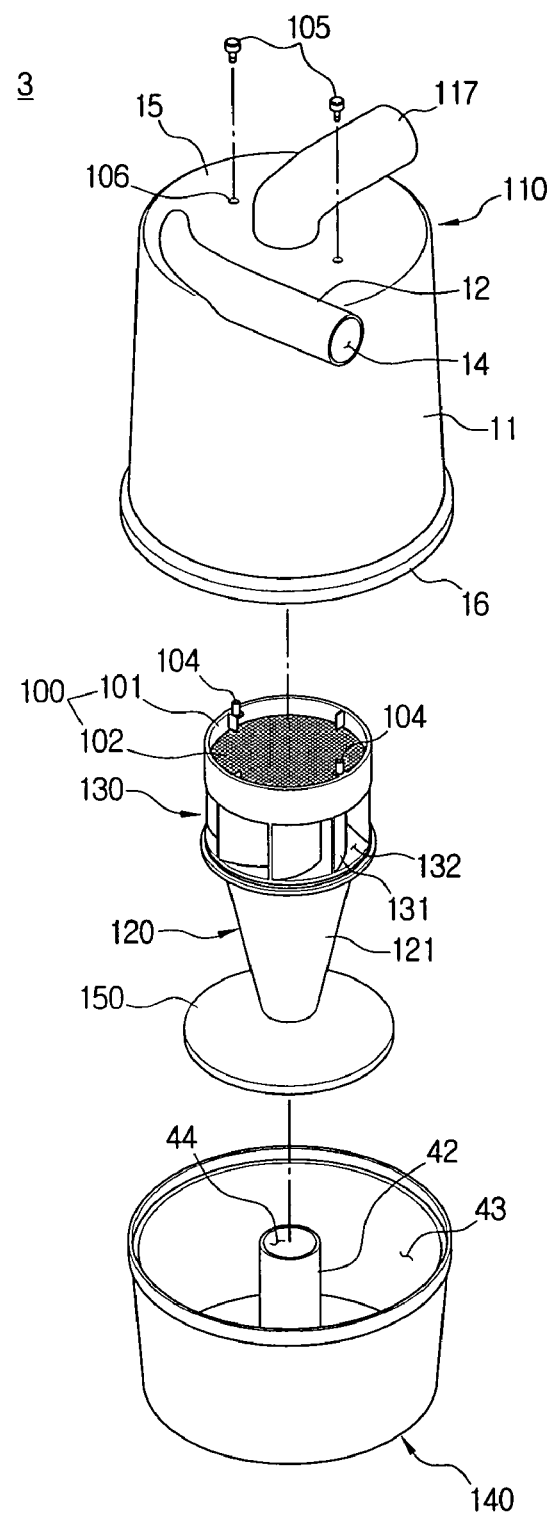
FIG. 9 is an exploded perspective view illustrating a cyclone dust collecting apparatus for a vacuum cleaner according to the third embodiment of the present disclosure.
Figure 10:
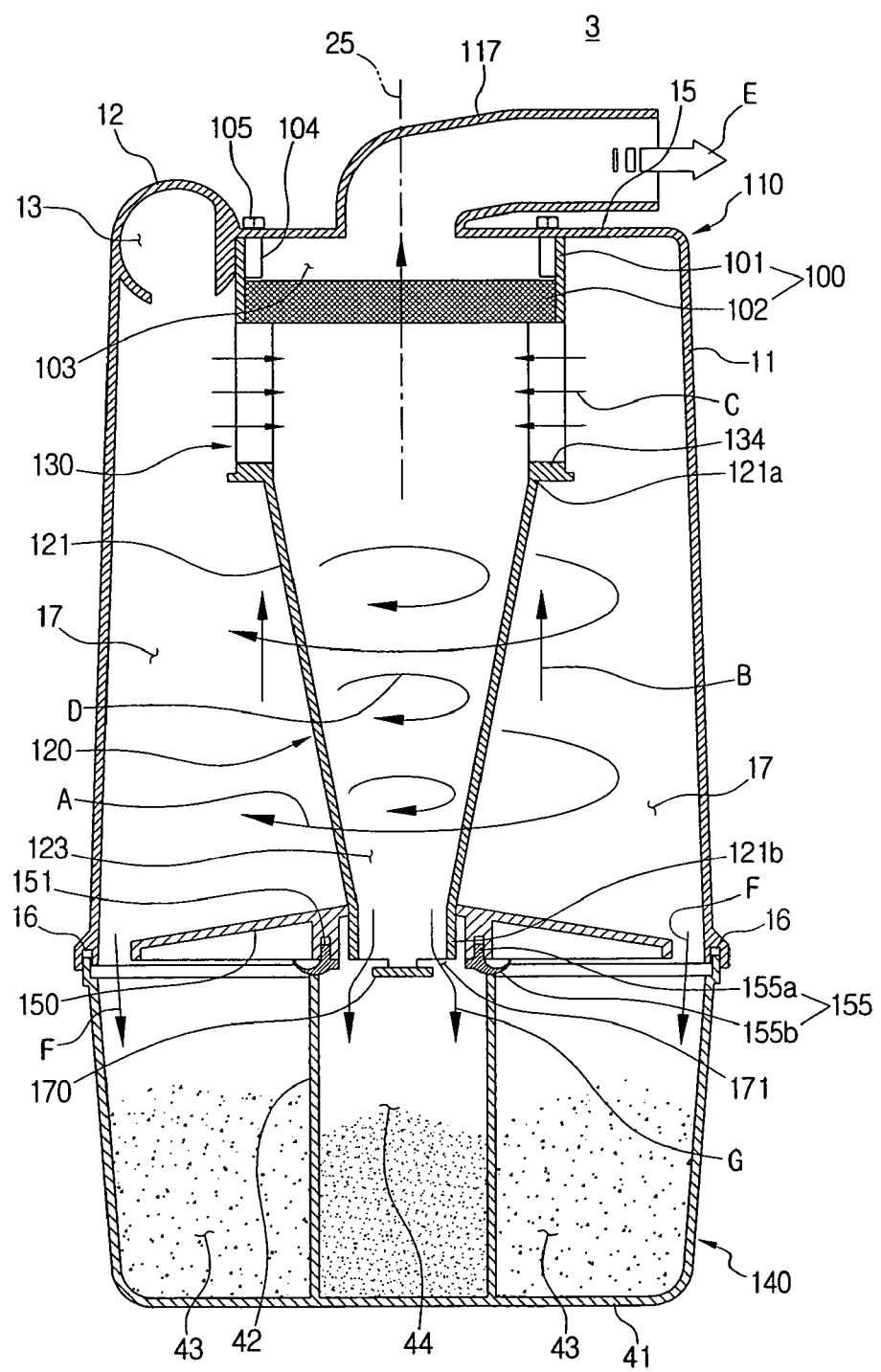
FIG. 10 is a sectional view illustrating the cyclone dust collecting apparatus of FIG. 9.

Referring to FIGS. 9 and 10, a cyclone dust collecting apparatus 3 for a vacuum cleaner according to the third embodiment of the present disclosure includes a first cyclone 110, a second cyclone 120, a filtering member 100, and a dust collecting receptacle 140.

The first cyclone 110 is substantially the same as the first cyclone 10 of the cyclone dust collecting apparatus 1 according to the first embodiment, exception that the air-discharging pipe 117 is disposed at a top wall 15 of the first cyclone body 11. The air-discharging pipe 117 discharges purified air E passed through the filtering member 100 to the vacuum generator (not shown).

The second cyclone 120 is disposed inside the first cyclone 110. The semi-clean air C discharged from the first cyclone 110 enters to form a second downwardly whirling air current D inside the second cyclone 120. Then, fine dust is separated from the semi-clean air by the centrifugal force caused by the second downwardly whirling air current D.

The second cyclone 120 includes a second cyclone body 121, and an air guiding member 130. The air guiding member 130 is disposed at a top end of the second cyclone body 121. The air guiding member 130 simultaneously functions as an air discharging opening through which the semi-clean air is discharged from the first cyclone 110 and an air entering opening through which the semi-clean air enters the second cyclone 120. In other words, the semi-clean air discharged from the first cyclone 110 directly enters inside the second cyclone 120 via the air guiding member 130. The air guiding member 130 has a bottom plate 134 and a plurality of guiding blades 131. The plurality of guiding blades 131 radially arranged on the bottom plate 134 in a circular shape based on a vertical axis 25 of the second cyclone 120. The plurality of guiding blades 131 is substantially the same as the guiding blades 31 of the cyclone dust collecting apparatus 1 according to the first embodiment, and therefore, a detailed description thereof is omitted.

The semi-clean air enters the second cyclone body 121 through the air guiding member 130, and then, whirls inside the second cyclone body 121. The second cyclone body 121 is the same as the second cyclone body 21 of the cyclone dust collecting apparatus 21 according to the first embodiment described above, and therefore, a detailed description thereof is omitted.

In this embodiment, the second cyclone body 121 is integrally formed with the air guiding member 130. Alternatively, although not shown, the air guiding member 130 is formed such that the air guiding member 130 can be detachably disposed to the second cyclone body 121. In other words, the second cyclone body 121 can be attachably/detachably coupled with a bottom end of the air guiding member 130 using a screw connection method in which a top end 121a of the second cyclone body 121 is formed as a male screw and the bottom end of the air guiding member 130 is formed as a female screw. Then, the second cyclone body 121 is turned in a direction so as to be separated from the air guiding member 130, and the second cyclone body 121 is turned an opposite direction so as to be coupled with the air guiding member 130. Alternatively, it is can be used another one touch connection method in which guiding grooves are formed at anyone of the top end of the second cyclone body 121 and the bottom end of the air guiding member 130, and fixing projections corresponding to the guiding grooves are formed at anyone of the bottom end of the air guiding member 130 and the top end of the second cyclone body 121. When the fixing projections are inserted into the guiding grooves and turned, the second cyclone body 121 is coupled with the air guiding member 130. When the second cyclone body 121 is turned in the opposite direction and pulled, the second cyclone body 121 is separated from the air guiding member 130. Also, any known detachable connection method can be applicable to the methods for separating/coupling the second cyclone body 121 from/with the air guiding member 130.

The filtering member 100 filters cleaned air that has fine dust removed in the second cyclone 120 and is discharged to the vacuum generator. The filtering member 100 is disposed between the top wall 15 of the first cyclone body 110 and the top end of the second cyclone 120. In other words, the filtering member 100 is disposed at the upper side of the air guiding member 130 of the second cyclone 120. The filtering member 100 has a filter housing 101 and a filter 102.

The filter 102 filters fine dust moving with the cleaned air discharged from the second cyclone 120 so that purified air E is discharged to the vacuum generator. Accordingly, the filter 102 prevents fine dust from entering and damaging the vacuum generator. Preferably, the filter 102 comprises a porous material such as a sponge and so on.

The filter housing 101 has a substantially hollow cylindrical shape. The filter 102 is disposed at a lower portion of the inside of the filter housing 101 so that the filter 102 is formed in a substantially cylindrical shape corresponding to the filter housing 101. At this time, the height of the filter 102 is preferably lower than the height of the filter housing 101 so that a space 103 is formed between the filter 102 and the top wall 15 of the first cyclone body 11. A top end of the filter housing 101 is detachably disposed on the top wall 15 of the first cyclone body 11. In this embodiment, the filter housing 101 is fixed on the first cyclone body 11 using fixing members 105 such as screws and so on as shown in FIG. 9. In other words, a plurality of fixing parts 104, in which the fixing members 105 are fixed, is formed at an upper portion of the filter housing 101, and a plurality of fixing holes 106 corresponding to the fixing parts 104 is formed at the top wall 15 of the first cyclone body 11. As a result, the filter housing 101 is fixed at the first cyclone body 11 by the plurality of fixing members 105. Various connecting methods can be used for the filter member 100 to be detachably connected to the first cyclone 110 in addition to the above-described method. For an example, the above-described connecting method connecting the air guiding member 130 with the second cyclone body 121 can be used.

Furthermore, the filter housing 101 can be formed such that the filter housing 101 is detachably disposed at the air guiding member 130. At this time, a bottom end of the filter housing 101 and the top end of the air guiding member 130 can have the above-described connecting structure of the air guiding member 130 and the second cyclone body 121.

The dust collecting receptacle 140 is the same as the dust collecting receptacle 40 of the cyclone dust collecting apparatus 1 according to the first embodiment as described above, and therefore, a detailed description thereof is omitted.

Figure 11:
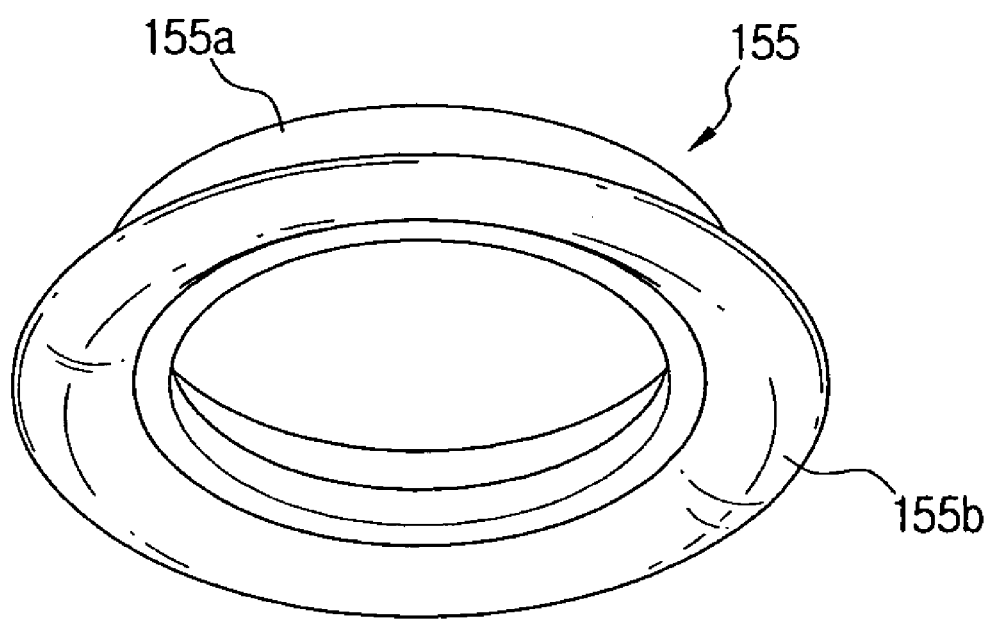
FIG. 11 is a perspective view illustrating a sealing member of FIG. 10.

A backflow preventing member 150 is disposed at a lower side of the second cyclone body 121 so as to prevent dust collected in the first dust collecting chamber 43 of the dust collecting receptacle 140 from re-scattering. A sealing member 155 is disposed at a bottom end of the backflow preventing member 150. The sealing member 155 seals the second dust collecting chamber 44 so that the second dust collecting chamber 44 is not in fluid communication with the first dust collecting chamber 43. The sealing member 155 is formed in a substantially ring shape corresponding to the partition wall 42 of the dust collecting receptacle 140 as shown in FIG. 11. A top end 155a of the sealing member 155 is fixed at a fixing groove 151 of the bottom end of the backflow preventing member 150, and a bottom end 155b of the sealing member 155 is formed in a shape that corresponds to the top end of the partition wall 42 and is rolled up by the partition wall 42. As a result, when the dust collecting receptacle 140 is inserted into the first connecting part 16 of the bottom end of the first cyclone body 11, the top end of the partition wall 42 pushes the sealing member 155 up so that the sealing member 155 seals the second dust collecting chamber 44. In other words, the airtightness between the first dust collecting chamber 43 and the second dust collecting chamber 44 is maintained or broken according to lifting or lowering of the dust collecting receptacle 140. When the sealing member 155 seals the second dust collecting chamber 44, the second downwardly whirling air current inside the second cyclone body 121 is not affected by the first downwardly whirling air current inside the first cyclone body 11.

Also, a dust cap 170 is disposed at the bottom end 121b of the second cyclone body 121 so as to prevent the fine dust collected in the second dust collecting chamber 44 from flowing back into the second cyclone body 121. The dust cap 170 is spaced apart from the bottom end 121b of the second cyclone body 121 by a predetermined distance so that fine dust separated in the second cyclone 120 can be discharged through a gap 171 between the dust cap 170 and the bottom end 121b of the second cyclone body 121.

Hereinafter, operation and function of the cyclone dust collecting apparatus 3 for a vacuum cleaner according to the third embodiment with the above-described structure is explained with reference to FIGS. 9 and 10.

Upon turning on the vacuum cleaner, a vacuum generator (not shown) is operated to generate suction force. Dust-laden air is drawn-in into the air suction pipe 12 of the first cyclone 110 by the suction force. The air suction pipe 12 is downwardly inclined in a tangential direction to the upper side of the first cyclone body 11 so that the dust-laden air passed through the air suction pipe 12 forms the first downwardly whirling air current A in the space 17 inside the first cyclone body 11. Then, dust is separated from the dust-laden air by centrifugal force caused by the first downwardly whirling air current A. The separated dust F falls along the inner surface of the first cyclone body 11, and then, is collected in the first dust collecting chamber 43 of the dust collecting receptacle 140 through the gap between the backflow preventing member 150 and the inner surface of the first cyclone body 11. Because the backflow preventing member 150 has the elasticity, heavy dust with a larger size than the size of the gap between the backflow preventing member 150 and the first cyclone body 11 such as bottle caps, cigarette butts, and so on can pass through the backflow preventing member 150, and is collected in the dust collecting receptacle 140.

The semi-clean air B having dust separated rises to enter the plurality of slots 132 of the air guiding member 130. The semi-clean air C passed through the plurality of slots 132 enters the second cyclone 120. At this time, the plurality of slots 132 are formed by the plurality of inclined guiding blades 131 so that the semi-clean air C passed through the plurality of slots 132 forms the second downwardly whirling air current D in the space 123 inside the second cyclone body 121. Then, fine dust remaining in the semi-clean air is separated by centrifugal force caused by the second downwardly whirling air current D. The separated fine dust G falls and is discharged to the second dust collecting chamber 44 through the gap 171 between the dust cap 170 and the second cyclone body 121. Cleaned air having fine dust removed re-rises and passes through a center of the air guiding member 130 and the filtering member 100 disposed on the air guiding member 130 so as to be discharged into the air discharging pipe 117. The filter 102 of the filtering member 100 filters fine dust remaining in cleaned air discharged from the second cyclone 120. A purified air E having the remaining fine dust removed passes through the vacuum generator (not shown), and then, is discharged outside the cleaner body (not shown).

When exchanging the filter 102 of the filtering member 100, or when cleaning the air guiding member 130 of the second cyclone 120, users separate the dust collecting receptacle 140 from the first cyclone body 11, and then, separate the filtering member 100 from the first cyclone body 11. Because the filtering member 100 is fixed to the first cyclone body 11 by the fixing members 105 such as screws, the users loosen the fixing member 105 so that the filtering member 100 is easily separated from the first cyclone body 11. When the filtering member 100 and the air guiding member 130 has a detachably connecting structure, the filtering member 100 can be separated from the air guiding member 130. Also, when the air guiding member 130 and the second cyclone body 121 has a detachably connecting structure, the second cyclone body 121 can be separated from the air guiding member 130. When the filtering member 100, the air guiding member 130, and the second cyclone body 121 are configured to be separated all together from the first cyclone body 11 or to be separated from each other as described above, it is convenient to clean and maintain the cyclone dust collecting apparatus 3.

Hereinafter, a cyclone dust collecting apparatus 4 for a vacuum cleaner according to the fourth embodiment of the present disclosure is described with reference to FIGS. 12 and 13.

Figure 12:
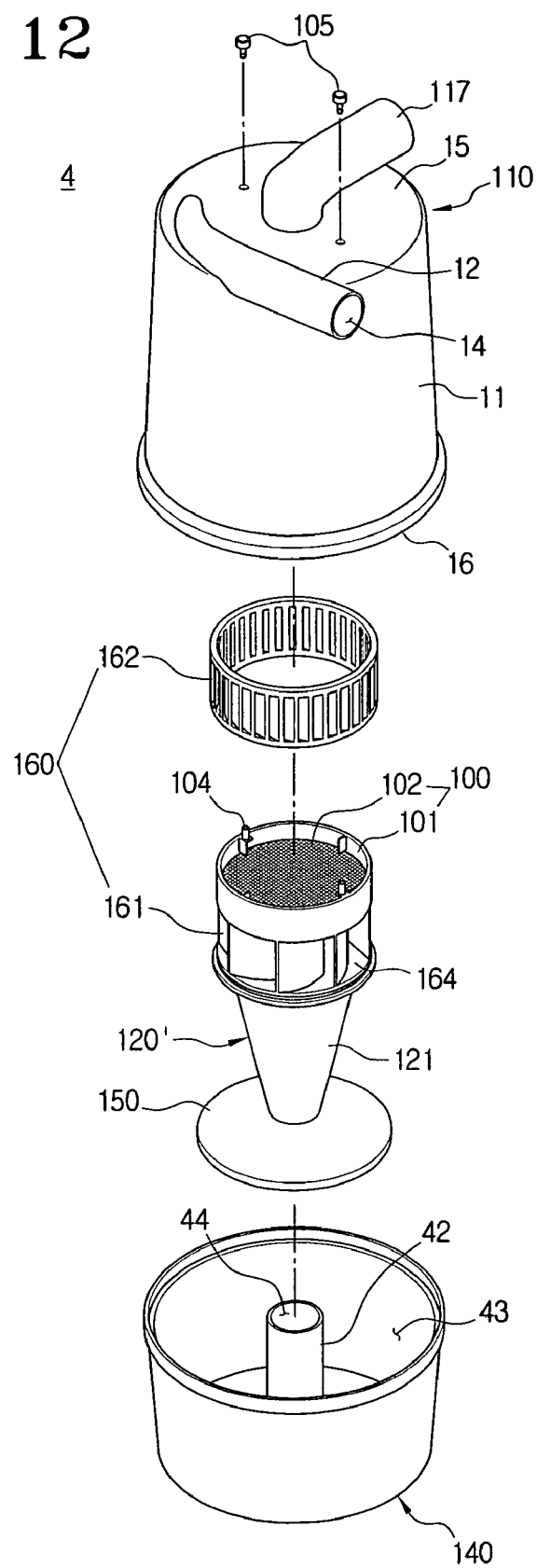
FIG. 12 is an exploded perspective view illustrating a cyclone dust collecting apparatus for a vacuum cleaner according to the fourth embodiment of the present disclosure.
Figure 13:
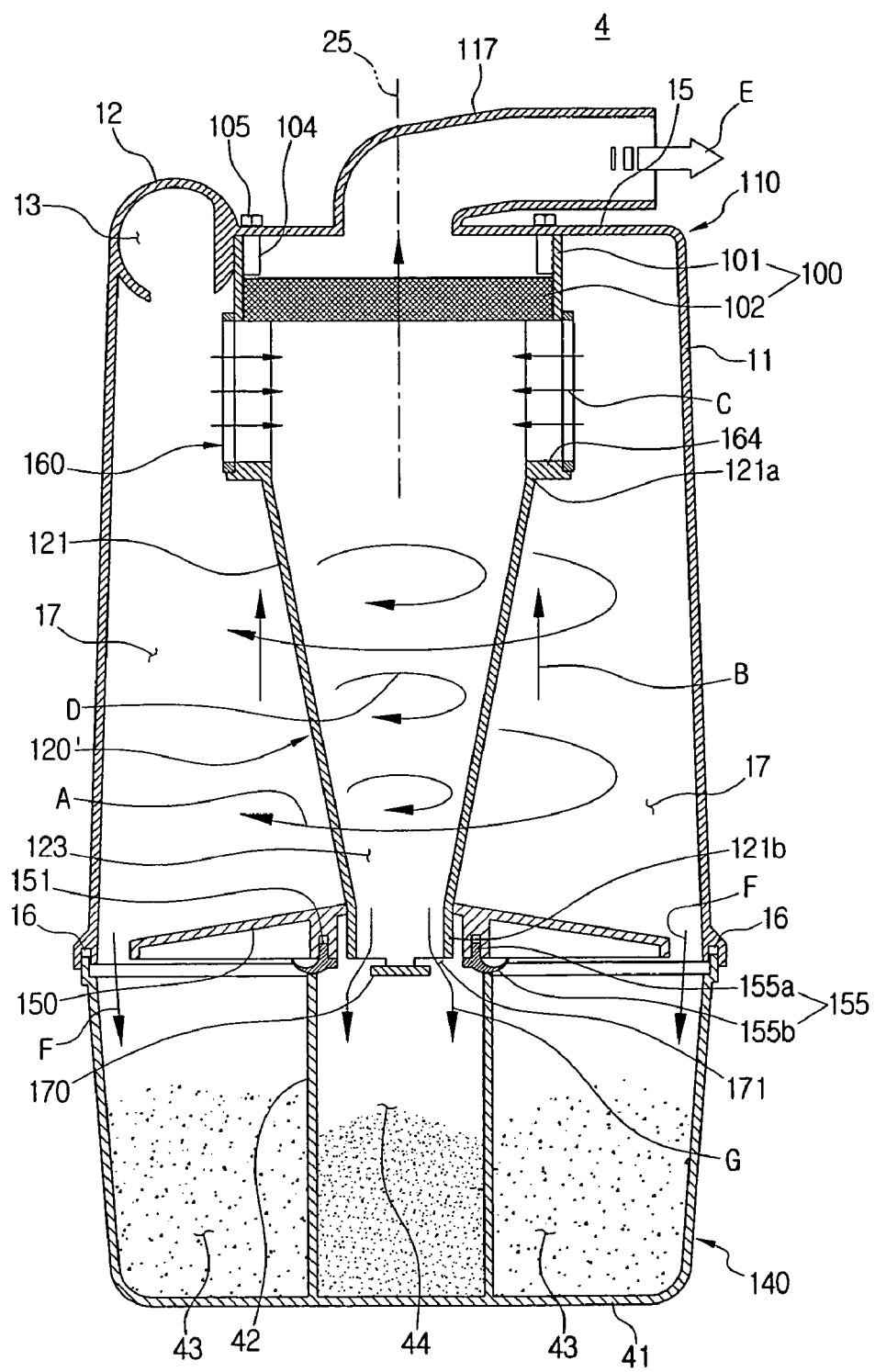
FIG. 13 is a sectional view illustrating the cyclone dust collecting apparatus of FIG. 12.

Referring to FIGS. 12 and 13, a cyclone dust collecting apparatus 4 for a vacuum cleaner according to the fourth embodiment of the present disclosure includes a first cyclone 110, a second cyclone 120', a filtering member 100, and a dust collecting receptacle 140.

The cyclone dust collecting apparatus 4 according to the fourth embodiment has the same first cyclone 110, filtering member 100, and dust collecting receptacle 140 as those of the cyclone dust collecting apparatus 3 according to the third embodiment as described above except the second cyclone 120'. Therefore, the second cyclone 120' is only described hereinafter.

The second cyclone 120' is disposed inside the first cyclone 110, takes the semi-clean air C discharged from the first cyclone 110, and forces the semi-clean air to form the second downwardly whirling air current D. Then, fine dust is separated from the semi-clean air by centrifugal force caused by the second downwardly whirling air current D.

The second cyclone 120' includes a second cyclone body 121, and an air guiding member 160. The air guiding member 160 is disposed at a top end of the second cyclone body 121, and the filtering member 100 is disposed at an upper side of the air guiding member 160. The air guiding member 160 simultaneously functions as an air discharging opening of the first cyclone 110 and an air entering opening of the second cyclone 120'. In other words, the semi-clean air discharged from the first cyclone 110 directly enters inside the second cyclone 120' via the air guiding member 160. The air guiding member 160 has a bottom plate 164 and a plurality of first and second guiding blades 161 and 162. The plurality of first and second guiding blades 161 and 162 radially arranged on the bottom plate 164 in two concentric circles based on a vertical axis 25 of the second cyclone 120' (see FIG. 7).

The bottom plate 164 is formed in a substantially doughnut shape so that the first and second guiding blades 161 and 162 are disposed on the bottom plate 164 in two concentric circles. At this time, the second guiding blades 162 are formed a separate part with a ring shape so that the second guiding blades 162 are mounted outside the first guiding blades 161. The arrangement and shape of the first and second guiding blades 161 and 162 are substantially the same as those of the first and second guiding blades 61 and 62 of the cyclone dust collecting apparatus 2 according to the second embodiment, and therefore, detailed descriptions thereof are omitted.

The second cyclone body 121 is the same as that of the cyclone dust collecting apparatus 3 according to the third embodiment as described above, and therefore, a detailed description thereof is omitted.

Furthermore, operation and function of the cyclone dust collecting apparatus 4 for a vacuum cleaner according to the fourth embodiment is substantially the same as those of the cyclone dust collecting apparatus 3 according to the third embodiment, and therefore, detailed descriptions thereof are omitted. However, there is one exception that the plurality of second guiding blades 162 filters dust moving with the semi-clean air, which is discharged from the first cyclone body 11 to the air guiding member 160, and the plurality of first guiding blades 161 forces the semi-clean air passed the air guiding member 160 to form the whirling air current. In other words, the second guiding blades 162 serves as a filter that filters dust entering from the first cyclone 110 to the second cyclone 120.

According to the cyclone dust collecting apparatus for a vacuum cleaner according to an embodiment of the present disclosure, because the first cyclone is in fluid communication with the second cyclone via a plurality of air pathways, namely, the plurality of slots, the pressure loss is decreased as compared with the conventional cyclone dust collecting apparatus. As a result, the present disclosure can provide a cyclone dust collecting apparatus for a vacuum cleaner that has a less pressure loss and a higher fine dust collecting efficiency than the conventional cyclone dust collecting apparatus.

When the filtering member is disposed at the upper side of the second cyclone, fine dust remaining in the cleaned air discharged from the second cyclone is removed so that the vacuum generator is not damaged by the fine dust.

Furthermore, in the cyclone dust collecting apparatus for a vacuum cleaner according to an embodiment of the present disclosure, because the first cyclone is directly in fluid communication with the second cyclone by the air guiding member, which simultaneously functions as an air discharging opening of the first cyclone and an air entering opening of the second cyclone, the length of the air pathway between the first and second cyclones is very short. As a result, a compact cyclone dust collecting apparatus can be provided, and the pressure loss of the cyclone dust collecting apparatus can be minimized.

Also, in the cyclone dust collecting apparatus according to an embodiment of the present disclosure, because the filtering member, the air guiding member, and the second cyclone body are configured to be separated all together from the first cyclone body or to be separated from each other, it is convenient to clean and maintain the cyclone dust collecting apparatus.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the disclosure.

What is claimed is:

1. A cyclone dust collecting apparatus for a vacuum cleaner comprising:
   a first cyclone having an air suction hole through which dust-laden air is drawn-in, the first cyclone forcing the dust-laden air to form a first downwardly whirling air current in a space under the air suction hole so as to centrifugally separate dust from the dust-laden air;
   a second cyclone disposed inside the first cyclone, the second cyclone forcing semi-clean air entering from the first cyclone to form a second downwardly whirling air current so as to centrifugally separate fine dust from the semi-clean air; and
   an air guiding member forcing the semi-clean air discharged from the first cyclone to directly enter the second cyclone and, the air guiding member having a plurality of guiding blades radially disposed in at least one circular shape based on a vertical axis of the second cyclone,
   wherein the plurality of guiding blades forms a plurality of slots to simultaneously function as an air discharging opening of the first cyclone and an air entering opening of the second cyclone,
   wherein the plurality of guiding blades are disposed about a base, wherein the base comprises an inclined surface that assists in forming the first downwardly whirling air current.

2. The cyclone dust collecting apparatus of claim 1, further comprising:
   an air suction pipe being downwardly inclined at an upper side of the first cyclone in a substantially tangential direction to the first cyclone body.

3. The cyclone dust collecting apparatus of claim 1, wherein the plurality of guiding blades comprises four guiding blades disposed by regular angular intervals based on the vertical axis.

4. The cyclone dust collecting apparatus of claim 1, wherein the plurality of guiding blades is inclined in a direction identical with or in a direction opposite to the direction of the first whirling air current.

5. The cyclone dust collecting apparatus of claim 1, further comprising;
   an air discharging pipe disposed at a center of a top end of the second cyclone, the air-discharging pipe extending to the same level as a bottom end of the air guiding member, or to a lower level than the bottom end of the air guiding member;
   wherein the air discharging pipe discharges cleaned air from the second cyclone in a direction opposite to the gravity direction.

6. The cyclone dust collecting apparatus of claim 1, wherein the air guiding member is disposed below the air suction hole.

7. The cyclone dust collecting apparatus of claim 1, further comprising:
   a dust collecting receptacle detachably disposed under the first and second cyclones so as to collect dust discharged from the first and second cyclones.

8. The cyclone dust collecting apparatus of claim 7, wherein the dust collecting receptacle comprises:
   a first dust collecting chamber collecting dust separated from the first cyclone; and
   a second dust collecting chamber collecting fine dust separated from the second cyclone.

9. The cyclone dust collecting apparatus of claim 8, further comprising:
   a sealing member disposed at a bottom end of the second cyclone, the sealing member sealing the second dust collecting chamber from fluid communication with the first dust collecting chamber.

10. The cyclone dust collecting apparatus of claim 9, wherein the sealing member is rolled up by the dust collecting receptacle so as to seal the second dust collecting chamber.

11. The cyclone dust collecting apparatus of claim 8, further comprising:
    a backflow preventing member disposed at the second cyclone, the backflow preventing member preventing dust collected in the first dust collecting chamber from flowing back into the first cyclone;
    wherein the backflow preventing member is made of an elastic material.

12. The cyclone dust collecting apparatus of claim 8, further comprising:
    a dust cap disposed at a bottom end of the second cyclone, the dust cap preventing fine dust collected in the second dust collecting chamber from flowing back into the second cyclone.

* * * * *